(12) United States Patent
Tan

(10) Patent No.: US 10,534,178 B2
(45) Date of Patent: Jan. 14, 2020

(54) DISPLAY APPARATUSES AND DISPLAY METHODS

(71) Applicant: BOE Technology Group Co., Ltd., Beijing (CN)

(72) Inventor: Jifeng Tan, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 59 days.

(21) Appl. No.: 15/749,572

(22) PCT Filed: Aug. 7, 2017

(86) PCT No.: PCT/CN2017/096225
§ 371 (c)(1),
(2) Date: Feb. 1, 2018

(87) PCT Pub. No.: WO2018/126677
PCT Pub. Date: Jul. 12, 2018

(65) Prior Publication Data
US 2019/0018244 A1  Jan. 17, 2019

(30) Foreign Application Priority Data

Jan. 5, 2017 (CN) .......................... 2017 1 0008823

(51) Int. Cl.
*G02B 27/14* (2006.01)
*G09G 5/00* (2006.01)
(Continued)

(52) U.S. Cl.
CPC ..... *G02B 27/0172* (2013.01); *G02B 27/0961* (2013.01); *G02F 1/29* (2013.01);
(Continued)

(58) Field of Classification Search
CPC ............ G02B 27/0172; G02B 27/0961; G02B 19/0028; G02B 2027/0174; G02F 1/29; G02F 1/1335
(Continued)

(56) References Cited

U.S. PATENT DOCUMENTS 5,900,981 A    5/1999   Oren et al.
9,372,349 B2   6/2016   Brug et al.
(Continued)

FOREIGN PATENT DOCUMENTS

CN    101726915 A    6/2010
CN    103635850 A    3/2014
(Continued)

OTHER PUBLICATIONS

International Search Report and Written Opinion for International Application No. PCT/CN2017/096225, dated Nov. 2, 2017, 10 pages.
(Continued)

*Primary Examiner* — William Choi
(74) *Attorney, Agent, or Firm* — Westman, Champlin & Koehler, P.A.

(57) ABSTRACT

The embodiments of the present disclosure disclose a display apparatus and a display method. The display apparatus comprises a display unit having a plurality of pixels; a collimation unit configured to collimate light in a light exit direction of the display unit to obtain collimated light; and an adjustment unit configured to deflect the collimated light so that light emitted by pixels at different positions in the display unit is imaged at different depths of field.

8 Claims, 6 Drawing Sheets

(51) Int. Cl.
 *G02B 27/01* (2006.01)
 *G02B 27/09* (2006.01)
 *G02F 1/29* (2006.01)
 *G02B 19/00* (2006.01)
 *G02F 1/1335* (2006.01)

(52) U.S. Cl.
 CPC .. *G02B 19/0028* (2013.01); *G02B 2027/0174* (2013.01); *G02F 1/1335* (2013.01)

(58) Field of Classification Search
 USPC .......................................... 359/630; 345/7–9
 See application file for complete search history.

(56) References Cited

U.S. PATENT DOCUMENTS

2010/0103348 A1    4/2010  Chen
2014/0168783 A1    6/2014  Luebke et al.

FOREIGN PATENT DOCUMENTS

| CN | 205281069 U | 6/2016 |
| CN | 105827922 A | 8/2016 |
| CN | 106094231 A | 11/2016 |
| CN | 106154797 A | 11/2016 |
| CN | 106526864 A | 3/2017 |

OTHER PUBLICATIONS

English translation of International Search Report and Written Opinion for International Application No. PCT/CN2017/096225, dated Nov. 2, 2017, 9 pages.

First Office Action, including Search Report, for Chinese Patent Application No. 201710008823.2, dated Jun. 1, 2018, 17 pages.

DISPLAY APPARATUSES AND DISPLAY METHODS

CROSS-REFERENCE TO RELATED APPLICATION(S)

This application is a Section 371 National Stage Application of International Application No. PCT/CN2017/096225, filed Aug. 7, 2017, which is not yet published, and claims priority to the Chinese Patent Application No. 201710008823.2, filed on Jan. 5, 2017, which are incorporated herein by reference in their entirety.

TECHNICAL FIELD

The present disclosure relates to the field of display, and more particularly, to a display apparatus and a display method.

BACKGROUND

The virtual reality display technology refers to virtualizing a real scene and generating a virtual image, and then presenting a combined image which is obtained through fusion to a viewer through a display apparatus. However, lenses used in the conventional virtual reality display technology are thick and heavy, and a single lens may introduce optical aberrations, which causes visual discomfort to a viewer. Further, a virtual image with an adjustable depth of field cannot be provided by using such lens-based imaging technology.

SUMMARY

According to an aspect of the present disclosure, there is proposed a display apparatus, comprising:
a display unit, having a plurality of pixels;
a collimation unit configured to collimate light in a light exit direction of the display unit to obtain collimated light; and
an adjustment unit configured to deflect the collimated light, so that pixels at different positions in the display unit is imaged at different depths of field.

In an example, the plurality of pixels in the display unit are arranged in an array, and light which is emitted by each of the plurality of pixels and is collimated by the collimation unit comprises at least a first part of light and a second part of light; and
the adjustment unit comprises a plurality of adjustment sub-units, wherein a first adjustment sub-unit and a second adjustment sub-unit are provided for the first part of light and the second part of light respectively, so that a first refraction angle for the first part of light is different from a second refraction angle for the second part of light.

In an example, for one row of pixels of two adjacent rows of pixels of the display unit, the first adjustment sub-unit and the second adjustment sub-unit are provided so that the first part of light and the second part of light converge at a first depth of field; and
for the other row of pixels of the two adjacent rows of pixels of the display unit, the first adjustment sub-unit and the second adjustment sub-unit are provided so that the first part of light and the second part of light converge at a second depth of field different from the first depth of field.

In an example, the first adjustment sub-unit and the second adjustment sub-unit are provided so that the first part of light which is emitted by the one row of pixels and is collimated by the collimation unit and the second part of light which is emitted by the other row of pixels and is collimated by the collimation unit converge at a third depth of field which is between the first depth of field and the second depth of field.

In an example, the first adjustment sub-unit and the second adjustment sub-unit are provided so that the second part of light which is emitted by the one row of pixels and is collimated by the collimation unit and the first part of light which is emitted by the other row of pixels and is collimated by the collimation unit are totally reflected.

In an example, one of the first depth of field and the second depth of field is in a range of 0.20 meters to 0.30 meters in a direction opposite to the light exit direction of the display unit and the other of the first depth of field and the second depth of field is in a range of 3 meters to 5 meters in the direction opposite to the light exit direction of the display unit.

According to another aspect of embodiments of the present disclosure, there is proposed a display method for a display apparatus which comprises a display unit having a plurality of pixels; a collimation unit configured to collimate light in a light exit direction of the display unit to obtain collimated light; and an adjustment unit configured to deflect the collimated light so that light emitted by pixels at different positions in the display unit is imaged at different depths of field, the display method comprising:
in a first time period, displaying a first frame of image at one row of pixels of the display unit, the first frame of image being deflected by the adjustment unit, so that the first frame of image is imaged at a first depth of field; and
in a second time period, displaying a second frame of image different from the first frame of image at the another row of pixels of the display unit which is adjacent to the one row of pixels, the second frame of image being deflected by the adjustment unit so that the second frame of image is imaged at a second depth of field different from the first depth of field.

In an example, the first frame of image comprises a foreground image, and the second frame of image comprises a background image.

In an example, the display method further comprises: in a third time period, displaying at least a third frame of image on the display unit, the third frame of image being deflected by the adjustment unit so that the third frame of image is imaged at a third depth of field which is between the first depth of field and the second depth of field.

BRIEF DESCRIPTION OF THE DRAWINGS

In order to describe the technical solutions in the embodiments of the present disclosure more clear, the accompanying drawings required for describing the embodiments will be described below in brief. Obviously, the accompanying drawings in the following description are merely some embodiments of the present disclosure. Other accompanying drawings can also be obtained by those of ordinary skill in the art based on these accompanying drawings without any creative work. In the accompanying drawings.

DETAILED DESCRIPTION

In order to make the purposes, technical solutions, and advantages of the embodiments of the present disclosure more clear, the technical solutions in the embodiments of the present disclosure are clearly and completely described hereinafter in conjunction with the accompanying drawings in the embodiments of the present disclosure. Obviously, the described embodiments are a part but not all of the embodiments of the present disclosure. All other embodiments obtained by those of ordinary skill in the art based on the described embodiments of the present disclosure without any creative work shall fall within the protection scope of the present disclosure. It should be illustrated that the same elements are denoted by the same or similar reference signs throughout the accompanying drawings. In the following description, some specific embodiments are merely for the purpose of description and should not be construed as limiting the present disclosure, but are merely examples of the embodiments of the present disclosure. Conventional structures or constructions may be omitted when they may cause confusion about the understanding of the present disclosure. It should be illustrated that shapes and dimensions of various components in the accompanying drawings do not reflect the true size and scale, and merely illustrate the content of the embodiments of the present disclosure.

Unless defined otherwise, technical terms or scientific terms used in the embodiments of the present disclosure shall be common meanings understood by those skilled in the art. Words such as "first," "second," etc. used in the embodiments of the present disclosure do not denote any order, quantity, or importance but is merely used to distinguish between different components.

Figure 1:
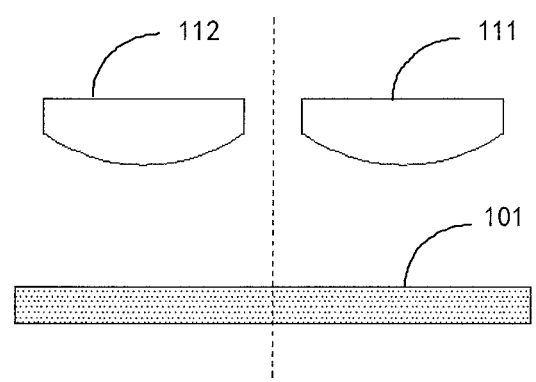
FIG. 1 illustrates a structural diagram of a virtual display apparatus.

A virtual reality display solution, as shown in FIG. 1, comprises a display screen 101, a first lens 111 and a second lens 112. The display screen 101 is used to display an image. The display screen 101 may be a single display screen which is divided into two display regions for displaying a left-eye image and a right-eye image respectively, or may also be two display screens which display the left-eye image and the right-eye image respectively. The first lens 111 and the second lens 112 are provided for the left-eye image and the right-eye image respectively, and a focal length of the lenses is greater than a distance between the display screen and the lenses so that the lenses function as magnifying glasses. Therefore, both eyes can view various magnified upright virtual images and fuse the virtual images in the brain, resulting in stereoscopic vision.

The embodiments of the present disclosure provide a display apparatus and a display method to improve a viewer's visual comfort or provide a virtual image with an adjustable depth of field, which are described in detail below in conjunction with the accompanying drawings.

Figure 2:
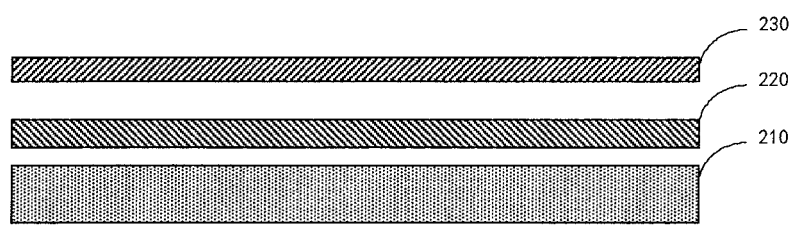
FIG. 2 illustrates a schematic sectional diagram of a display apparatus according to an embodiment of the present disclosure.

FIG. 2 illustrates a schematic sectional view of a display apparatus 200 according to an embodiment of the present disclosure. As shown in FIG. 2, the display apparatus 200 comprises a display unit 210, a collimation unit 220, and an adjustment unit 230. The display unit 210 has a plurality of pixels. The collimation unit 220 is provided in a light exit direction of the display unit 210 and collimates light in the light exit direction of the display unit 210 to obtain collimated light. The adjustment unit 230 deflects the collimated light, so that light emitted by pixels at different positions in the display unit is imaged at different depths of field.

Figure 3:
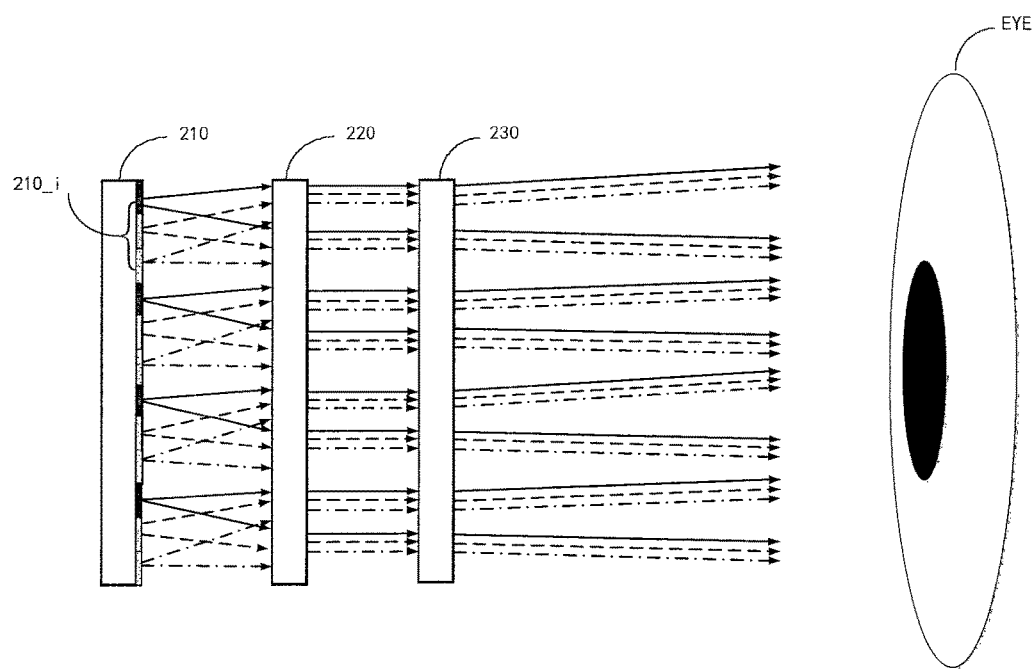
FIG. 3 illustrates a schematic diagram of a light path of a display apparatus according to an embodiment of the present disclosure.

FIG. 3 illustrates a schematic diagram of a light path of a display apparatus 200 according to an embodiment of the present disclosure. The display unit 210 comprises a plurality of pixels arranged in an array, and each of the plurality of pixels may emit light in red (R), green (G), and blue (B), for example. For convenience of illustration, FIG. 3 illustrates one pixel 210_i in one column of pixels of the display unit as including three portions indicated by different shades, which emit light in red, green and blue respectively. As will be understood by those skilled in the art, the structure illustrated in FIG. 3 is not essential as long as one pixel can emit light in corresponding colors. For convenience of distinction, in this figure, the light in red is indicated as a solid line, the light in green is indicated as a dotted line, and the light in blue is indicated as a dot dash line.

As shown in FIG. 3, the light in the light exit direction of the display unit 210 is incident on the collimation unit 220. The collimation unit 220 collimates the incident light to obtain collimated light. The collimated light is incident on the adjustment unit 230. The adjustment unit 230 deflects the incident collimated light, so that light emitted by pixels at different positions in the display unit is imaged at different depths of field. It can be visually viewed by human eyes that the light emitted by different pixels in the display unit 210 is imaged at different depths of field.

It should be illustrated that according to the embodiments of the present disclosure, the term "deflect" means that light deviates from an original direction after the light is refracted or reflected by an optical element.

Figure 4:
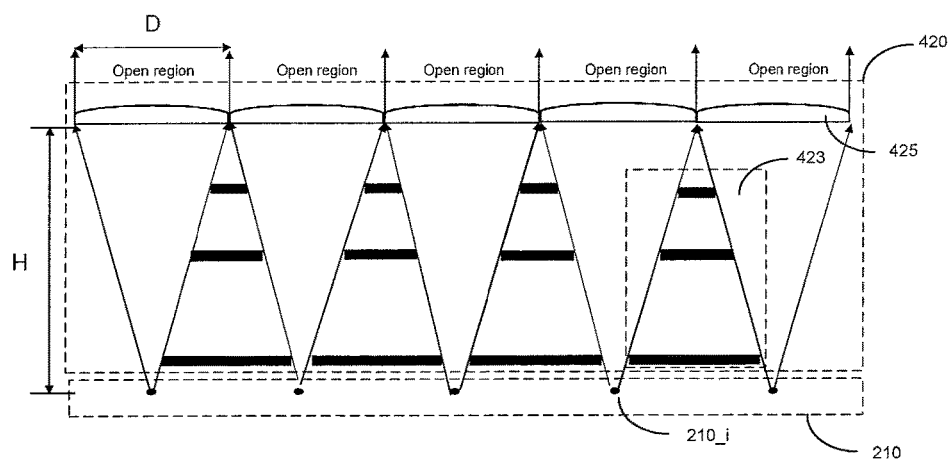
FIG. 4 illustrates a diagram of a first exemplary collimation unit according to an embodiment of the present disclosure.

FIG. 4 illustrates a diagram of a first exemplary collimation unit 420 according to an embodiment of the present disclosure. As shown in FIG. 4, the first exemplary collimation unit 420 according to the embodiment of the present disclosure may comprise shielding structures 423 and lenses 425. Pixels 210_i included in the display unit 210 may be regarded as point light sources. A corresponding lens 425 is provided for each pixel 210_i, and the pixel 210_i is placed at a focus of the lens 425, wherein H is a focal length of the lens 425, and D is a diameter of an open region of the pixel. Light within a lens aperture of the lens 425 is refracted by the lens 425 into parallel light, so that divergent light emitted by the pixel 210_i is collimated into collimated light. In addition, the shielding structure 423 shields light which may exist outside the lens aperture, which further improves the collimation of the light emitted from the collimation unit. For example, the shielding structure 423 may be composed of a plurality of stacked black light shielding layers.

Figure 5A:
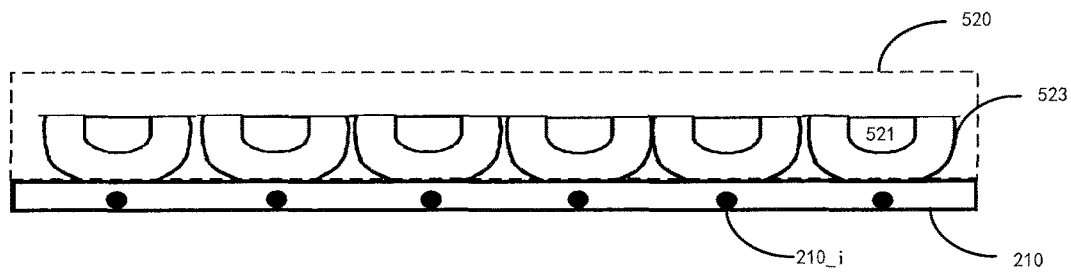
FIG. 5A illustrates a diagram of a second exemplary collimation unit according to an embodiment of the present disclosure.
Figure 5B:
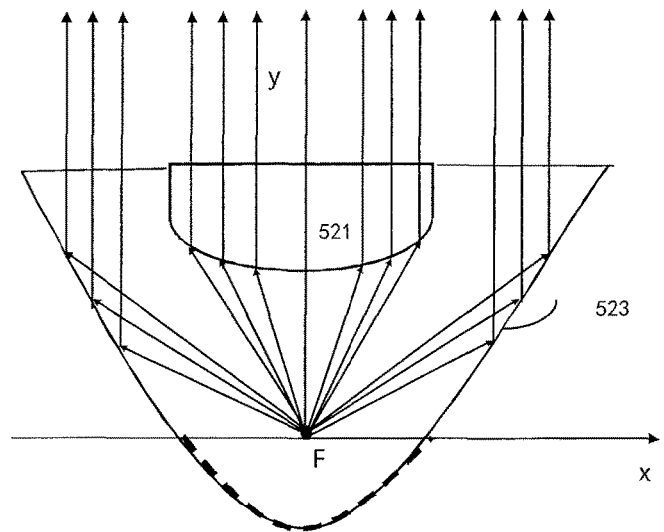
FIG. 5B illustrates a diagram of a light path of the collimation unit in FIG. 5A.

FIG. 5A illustrates a structural diagram of a second exemplary collimation unit 520, and FIG. 5B illustrates a diagram of a light path of the collimation unit 520 in FIG. 5A. As shown in FIG. 5A, the collimation unit 520 may comprise convex lenses 521 and parabolic reflectors 523. The pixels 210_i included in the display unit 210 may be regarded as point light sources. A corresponding convex lens 521 and a corresponding parabolic reflector 523 are provided for each pixel 210_i, and the pixel 210_i is placed at a focal point F of the convex lens 521 and the parabolic reflector 523. Light within a lens aperture of the convex lens 521 is refracted by the convex lens 521 into parallel light, so that divergent light emitted by the pixel 210_i is collimated into collimated light. In addition, the parabolic reflector 523 collimates the light outside an aperture of the convex lens 521. At the same time, the parabolic reflector 523 also avoids stray light from other neighboring pixels.

Figure 6:
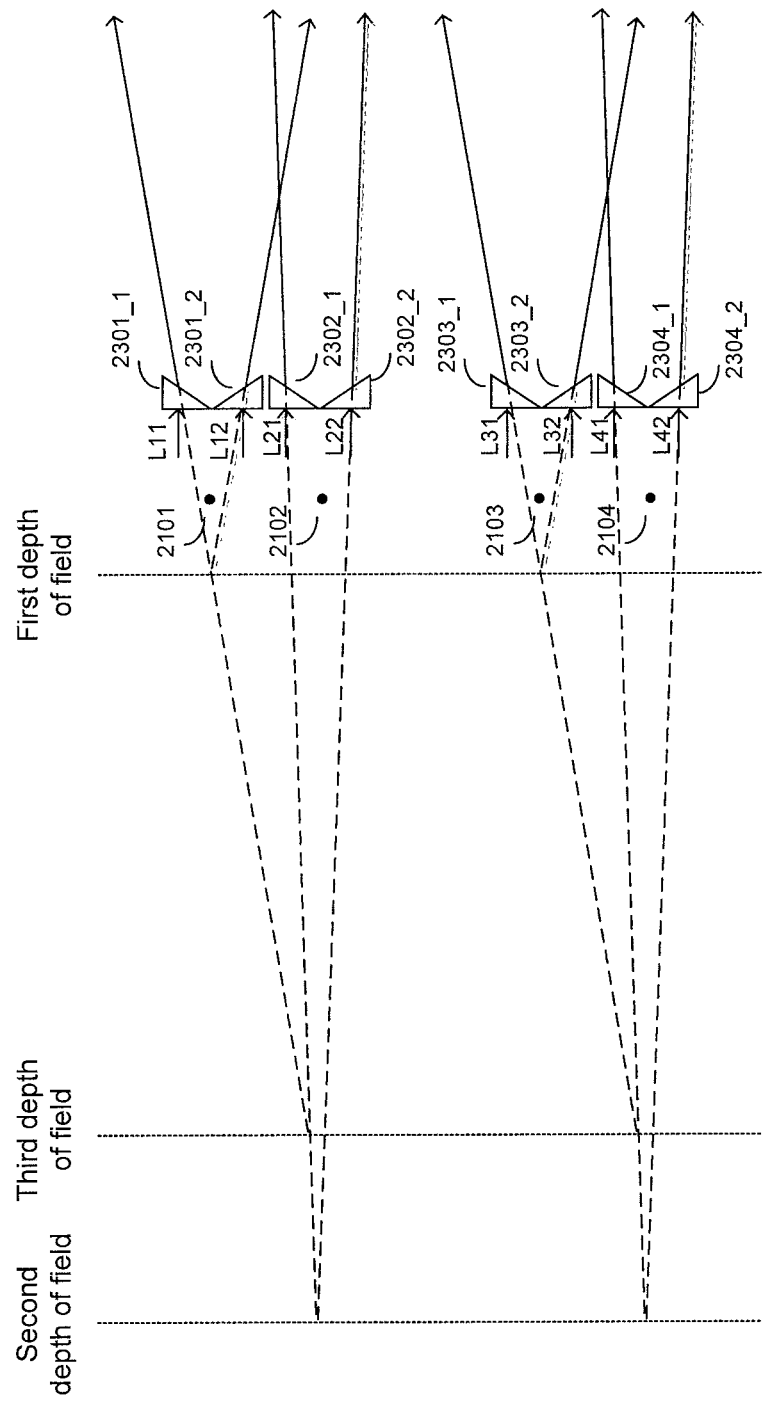
FIG. 6 illustrates a schematic diagram of a light path of an adjustment unit according to an embodiment of the present disclosure.

According to an embodiment of the present disclosure, the light which is emitted by each of the pixels included in the display unit 210 and is then collimated by the collimation unit may comprise at least a first part of light and a second part of light, and the adjustment unit 230 is configured to deflect the first part of light and the second part of light at different angles. FIG. 6 illustrates a diagram of adjustment of light by the adjustment unit 230 according to an embodiment of the present disclosure. In FIG. 6, how to adjust light by the adjustment unit 230 is described by taking four pixels 2101, 2102, 2103 and 2104 in one column of pixels in the display unit as an example. For clarity of illustration, a collimation unit between the display unit 210 and the adjustment unit 230 is omitted in FIG. 6. For example, for the first pixel 2101, light which is processed by the collimation unit may comprise a first part of light L11 and a second part of light L12. Similarly, light which is emitted by the second pixel 2102 and is processed by the collimation unit may comprise a first part of light L21 and a second part of light L22, light which is emitted by the third pixel 2103 and is processed by the collimation unit may comprise a first part of light L31 and a second part of light L32, and light which is emitted by the fourth pixel 2104 and is processed by the collimation unit may comprise a first part of light L41 and a second part of light L42. A first adjustment sub-unit 2301_1 and a second adjustment sub-unit 2301_2 are provided for the first part of light L11 and the second part of light L12 of the first pixel 2101 respectively. Similarly, adjustment sub-units are provided for respective first part of light and second part of light of the second pixel 2102 to the fourth pixel 2104 respectively. Although the adjustment unit 230 is shown in FIG. 6 as including a plurality of adjustment sub-units formed of prisms, it should be understood by those skilled in the art that the adjustment unit 230 may be implemented by other means such as convex lenses, Fresnel lenses, gratings, liquid crystal lenses etc., as long as different parts of light emitted by the same pixel can be deflected at different angles.

Figure 7:
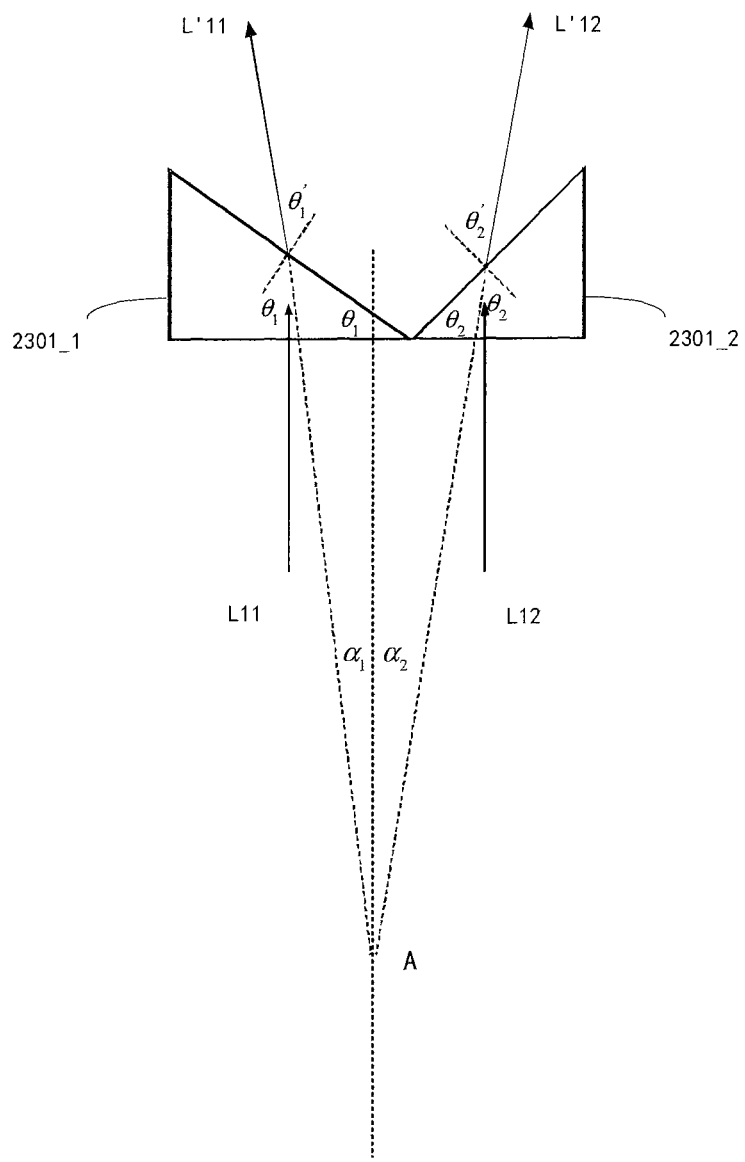
FIG. 7 illustrates a diagram of a light path of refractive light from an adjustment unit according to an embodiment of the present disclosure.

By taking the first pixel 2101 as an example, the first adjustment sub-unit 2301_1 and the second adjustment sub-unit 2301_2 are provided for the first part of light L11 and the second part of light L12 of the first pixel 2101 respectively. FIG. 7 illustrates a diagram of light paths of refraction of the first part of light and the second part of light of the first pixel 2101. The refraction principle of the adjustment sub-unit according to an embodiment of the present disclosure will be described in detail below in conjunction with FIGS. 6 and 7. It should be illustrated that the first part of light and the second part of light according to the embodiment of the present disclosure may be mixed light including, for example, R, G, and B, and for the sake of clarity of the illustration, in FIGS. 6 and 7, the mixed light is equivalent to one light beam and the adjustment unit is equivalently shown as prisms.

As shown in FIG. 7, the light which is emitted by the first pixel 2101 and is collimated by the collimation unit comprises the first part of light L11 and the second part of light L12. The first adjustment sub-unit 2301_1 and the second adjustment sub-unit 2301_2 are provided for the first part of light L11 and the second part of light L12, respectively. The first adjustment sub-unit 2301_1 and the second adjustment sub-unit 2301_2 are shown as prisms by way of example. $\theta_1$ is an incident angle of the first part of light L11 relative to the first adjustment sub-unit 2301_1 and $\theta_2$ is an incident angle of the second part of light L12 relative to the second adjustment sub-unit 2301_2, i.e., $\theta_1$ and $\theta_2$ are angles between the first part of light L11 and the second part of light L12 and normal lines of oblique planes of the prisms respectively. After the first part of light L11 and the second part of light L12 are refracted by the prisms, an angle between refracted light L11' of the first part of light L11 and the normal line is $\theta_1'$, and an angle between refracted light L12' of the second part of light L12 and the normal line is $\theta_2'$. When the refracted light L11' and L12' enters human eyes, the light may converge to a point A in a space after it is imaged by the human eyes, that is, the human eyes view that an image of the first pixel 2101 is located at the point A. $\alpha$ is an angle (a divergence angle) between light emitted from the point A relative to the human eyes, wherein $\alpha = \alpha_1 + \alpha_2$, as shown in FIG. 7. Magnitude of the divergence angle $\alpha$ determines a vertical distance between the point A (i.e., the image of the first pixel 2101) and the human eyes. The larger the value of $\alpha$, the smaller the vertical distance between the point A and the human eyes, that is, the smaller the distance from the first pixel 2101 which is perceived by the human eyes. On the contrary, the smaller the value of $\alpha$, the larger the vertical distance between the point A and the human eyes, that is, the larger the distance from the first pixel 2101 which is perceived by the human eyes.

It can be known from the light refraction law that:

$$n \sin \theta_1 = n_2 \sin \theta_1'$$

$$n_1 \sin \theta_2 = n_2 \sin \theta_2' \quad \text{(Equation 1)}$$

where n1 is a refractive index of a prism and n2 is a refractive index of an external medium (for example, air). The following equations can be obtained according to a geometrical relationship:

$$\alpha_1 = \theta_1' - \theta_1$$

$$\alpha_2 = \theta_2' - \theta_2$$

$$\theta_1' \geq \theta_1$$

$$\theta_2' \geq \theta_2$$

It can be known from the above equations that $$\alpha = \alpha_1 + \alpha_2 = \theta_1' + \theta_2' - \theta_2 - \theta_1 \quad \text{(Equation 2)}$$

For the above equation (1) and equation (2), n1 and n2 are known. Assuming that the point A where the image of the first pixel 2101 is located is in a plane parallel to a plane where the display unit is located, a vertical distance D between the plane and the human eyes is referred to as a depth of field. When it is desired to image at a given depth of field, a corresponding divergence angle $\alpha$ may be determined according to a size of the first pixel 2101 (related to a resolution of the display unit) and an actual vertical distance between the first pixel 2101 and the human eyes, and therefore, an angle corresponding to the equivalent prisms may be obtained from the equation (1) and the equation (2).

For example, if it is desired that the vertical distance D (depth of field) between the plane and the human eyes is 20 cm, a corresponding divergence angle may be determined to be 0.86°, i.e., α=0.86. For example, assuming that n1=1.5, n2=1.0 and $\theta_1$=0.5°, the following values may be obtained according to the equation (1) and the equation (2):

$\theta_1'$=0.75°, $\theta_2$=1.8° and $\theta_2'$=1.2°.

Therefore, according to the embodiments of the present disclosure, the adjustment sub-units may be flexibly designed to obtain a predetermined depth of field for each part of light emitted by each pixel of the display unit. It can be envisaged by those skilled in the art that a correspondence relationship between the predetermined depth of field and the divergence angle α may be calculated in advance according to practical situations. Table 1 below illustrates an example of the correspondence relationship between the predetermined depth of field and the divergence angle α. A depth of field D between 20 cm and 50 cm is a distance range which realizes relatively comfortable near vision feeling for human eyes, and a depth of field D between 1 m and 3 m is a distance range which realizes relatively comfortable distant vision feeling for human eyes.

TABLE 1

| Depth of field D | Spatial divergence angle α |
|---|---|
| 20 cm | 0.86° |
| 35 cm | 0.49° |
| 50 cm | 0.34° |
| 1 m | 0.17° |
| 2 m | 0.086° |
| 3 m | 0.057° |
| Infinity | 0 |

As described above, the image of the first pixel 2101 may be imaged at a first depth of field which has a depth of field D of 20 cm using the first adjustment sub-unit 2301_1 and the second adjustment sub-unit 2301_2. As shown in FIG. 6, for the third pixel 2103, a corresponding first adjustment sub-unit 2303_1 and a corresponding second adjustment sub-unit 2303_2 may be designed in the same manner as those for the first pixel 2101, and an image of the third pixel 2103 may also be imaged at the first depth of field which has a depth of field D of 20 cm. Similarly, for example, corresponding adjustment sub-units may be designed in the same manner as above for odd rows of pixels of the display unit 210 such as a fifth pixel, a seventh pixel, etc., so that all the odd rows of pixels are also imaged at the first depth of field which has a depth of field D of 20 cm. Thereby, when the odd rows of pixels of the display unit 210 display a first frame of image, the image of the first frame of image may be formed at the first depth of field. For example, the first frame of image may be a foreground image such as a character etc.

In addition, for the second pixel 2102, a corresponding first adjustment sub-unit 2302_1 and a corresponding second adjustment sub-unit 2302_2 may be designed to image an image of the second pixel 2102 at a second depth of field D which has a depth of field of 3 m for example. Similarly, for example, corresponding adjustment sub-units may be designed in the same manner as above for even rows of pixels of the display unit such as a fourth pixel, a sixth pixel, an eighth pixel, etc., so that all the even rows of pixels are also imaged at the second depth of field which has a depth of field D of 3 m. Thereby, when the even rows of pixels of the display unit 210 display a second frame of image, the image of the second frame of image may be formed at the second depth of field. For example, the second frame of image may be a background image such as a landscape etc.

It can be understood by those skilled in the art that the above display manners of the first frame of image and the second frame of image are merely examples, and the odd rows of images may be imaged at the second depth of field and the even rows of images may be imaged at the first depth of field. Of course, other display manners may also be used.

In addition, as shown in FIG. 6, for example, the first part of light L11 of the first pixel 2101 and the second part of light L21 of the second pixel 2102 may converge at a third depth of field which is between the first depth of field and the second depth of field, that is, may be imaged at the third depth of field, and this imaging manner may be referred to as "pixel borrowing." When a third frame of image is displayed on the display unit 210, control may be performed so that respective collimated light incident on the adjustment sub-unit 2301_1 and the adjustment sub-unit 2302_2 are refracted by the adjustment sub-unit 2301_1 for the first part of light L11 of the first pixel 2101 and the adjustment sub-unit 2302_2 for the second part of light L22 of the second pixel 2102 while respective collimated light incident on the adjustment sub-unit 2301_2 and the adjustment sub-unit 2302_1 are totally reflected by the adjustment sub-unit 2301_2 for the second part of light L12 of the first pixel 2101 and the adjustment sub-unit 2302_1 for the first part of light L21 of the second pixel 2102, and thereby respective collimated light incident on the adjustment sub-unit 2301_2 and the adjustment sub-unit 2302_1 will not be emitted from the adjustment sub-unit 2301_2 and the adjustment sub-unit 2302_1, and an image which may interfere with the images displayed at the first depth of field, the second depth of field and the third depth of field will not be formed; respective collimated light incident on the adjustment sub-unit 2303_1 and the adjustment sub-unit 2304_2 are refracted by the adjustment sub-unit 2303_1 for the first part of light L31 of the third pixel 2103 and the adjustment sub-unit 2304_2 for the second part of light L42 of the fourth pixel 2104 while respective collimated light incident on the adjustment sub-unit 2303_2 and the adjustment sub-unit 2304_1 are totally reflected by the adjustment sub-unit 2303_2 for the second part of light L32 of the third pixel 2103 and the adjustment sub-unit 2304_1 for the first part of light L41 of the fourth pixel 2104, . . . and so on, thereby forming the image of the third frame of image at the third depth of field which is between the first depth of field and second depth of field. For example, the above embodiments can be realized by turning on the adjustment sub-units 2301_1, 2302_2, 2303_1, and 2304_2 and turning off the adjustment sub-units 2301_2, 2302_1, 2303_2, and 2304_1 in corresponding periods when the adjustment unit is implemented using liquid crystal lenses or gratings.

It can be understood by those skilled in the art that the foregoing pixel borrowing manner is merely an example and the image of the third frame of image may be formed at the third depth of field which is between the first depth of field and the second depth of field by controlling a display timing of the display unit 210 for the odd rows of images (the first frame of image), the even rows of images (the second frame of image) and complete images (the third frame of image) in combination with control of turn-on and turn-off of the adjustment sub-units according to practical requirements. For example, by taking implementation of the adjustment unit using liquid crystal lenses or gratings an example, all the adjustment sub-units are turned on in a first display period and the display unit 210 displays a first frame of image which comprises only odd rows of images, wherein the first frame of image is imaged at a first depth of field; all the adjustment sub-units are turned on in a second display period and the display unit 210 displays a second frame of image which comprises only even rows of images, wherein the second frame of image is imaged at a second depth of field; and one part of the adjustment sub-units are turned on and the other part of the adjustment sub-units are turned off in a third display period, and the display unit 210 displays a third frame of image which comprises complete images, wherein the third frame of image is imaged at a third depth of field which is between the first depth of field and the second depth of field.

According to an embodiment of the present disclosure, when the adjustment unit images corresponding pixels by diverging the incident collimated light, there may be a problem that light emitted by pixels at an edge portion of the display unit cannot enter the human eyes. As described above, refractive indexes n1 and n2, a divergence angle α, as well as one of $\theta_1$ and $\theta_2$ are preset when parameters $\theta_1'$, $\theta_2$ and $\theta_2'$ of an adjustment sub-unit are calculated. For a given depth of field D, the divergence angle α is predetermined, and n1 and n2 as well as at least one of $\theta_1$ or $\theta_2$ may be set according to a region where a corresponding pixel is located, so that the farther the pixel is away from a center of the display unit, the smaller $\theta_1$ or $\theta_2$ will be. Thereby, even for a pixel in an edge region of the display unit, light emitted by the pixel can also be viewed by human eyes.

For example, when the adjustment unit 230 is implemented using prisms or lenses, the refractive indexes n1 and n2 are fixed, and a value of $\theta_1$ or $\theta_2$ may be adjusted. For example, the larger the linear distance between the region where the corresponding pixel is located and the human eyes, i.e., the farther the pixel is away from the center of the display unit, the smaller $\theta_1$ or $\theta_2$ may be correspondingly set, and the smaller the linear distance between the region where the corresponding pixel is located and the human eyes, i.e., the closer the pixel is away from the center of the display unit, the larger $\theta_1$ or $\theta_2$ may be correspondingly set. In this way, light emitted by a pixel in an edge region of the display unit can also be viewed by human eyes even if the adjustment unit diverges the incident light. Therefore, when each of the adjustment sub-units according to the embodiments of the present disclosure is designed, those skilled in the art can set a reference value of $\theta_1$ or $\theta_2$ according to practical situations, for example, according to a size of a display area of the display unit 210 and a vertical distance between the human eyes and a plane where the display unit is located, and correspondingly increase or decrease the value of $\theta_1$ or $\theta_2$ according to the position where the corresponding pixel is located.

In addition, when the adjustment unit 230 is implemented using, for example, liquid crystal lenses, refractive indexes of the liquid crystal lenses may be changed according to voltages applied to the liquid crystal lenses, that is, refractive indexes n1 and n2 are variable and thus a value of $\theta_1'$ or $\theta_2'$ can be more flexibly adjusted, so that the refracted light from a pixel in the edge region of the display unit can also be viewed by the human eyes.

Figure 8:
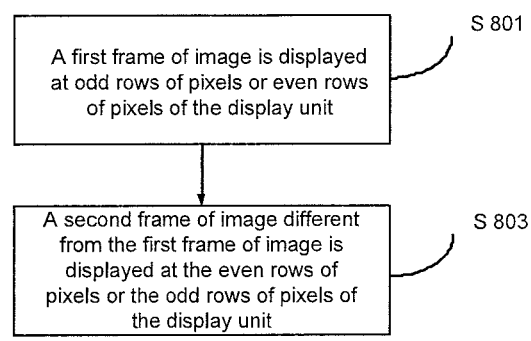
FIG. 8 illustrates a flowchart of a display method according to an embodiment of the present disclosure.

According to an embodiment of the present disclosure, a display method for a display apparatus according to an embodiment of the present disclosure is also proposed. FIG. 8 illustrates a flowchart of a display method according to an embodiment of the present disclosure. It should be illustrated that serial numbers of steps in the following method are only used as representation of the steps for convenience of description, and should not be regarded as representing an execution order of the various steps. Unless explicitly stated otherwise, this method need not be performed in an order which is exactly as shown. As shown in FIG. 8, the display method 80 according to the embodiment of the present disclosure may comprise the following steps.

In step S801, in a first time period, a first frame of image is displayed at odd rows of pixels or even rows of pixels of the display unit, and the first frame of image is deflected by the adjustment unit, so that the first frame of image is imaged at a first depth of field.

In step S803, in a second time period, a second frame of image different from the first frame of image is displayed at the even rows of pixels or the odd rows of pixels of the display unit, and the second frame of image is deflected by the adjustment unit, so that the second frame of image is imaged at a second depth of field different from the first depth of field.

For example, the first frame of image may be, for example, one frame in a first image sequence for a foreground object such as a character etc. and the second frame of image may be, for example, one frame in a second image sequence for a background object such as a landscape etc. The display unit may be controlled to periodically perform the above steps S801 and S803, so that the viewer can visually view an image sequence which comprises the foreground object at the first depth of field and the background object at the second depth of field.

The display method according to the embodiment of the present disclosure may further comprise in a third time period, displaying, by the display unit, at least a third frame of image, the third frame of image being deflected by the adjustment unit so that the third frame of image is imaged at a third depth of field which is between the first depth of field and the second depth of field. In an example, the display of the third frame of image may be achieved by borrowing between different parts of light which are emitted by adjacent pixels and are collimated by the collimation unit. For example, the display unit 210 may be controlled so that all the adjustment sub-units are turned on in a first display period and the display unit 210 displays a first frame of image which comprises only odd rows of images or even rows of images, wherein the first frame of image is imaged at a first depth of field; all the adjustment sub-units are turned on in a second display period and the display unit 210 displays a second frame of image which comprises only the even rows of images or the odd rows of images, wherein the second frame of image is imaged at a second depth of field; and one part of the adjustment sub-units are turned on and the other part of the adjustment sub-units are turned off in a third display period so that collimated light incident on the other part of adjustment sub-units are totally reflected, and the display unit 210 displays a third frame of image which comprises complete images, wherein the third frame of image is imaged at a third depth of field which is between the first depth of field and the second depth of field. For example, the third frame of image may be one frame in a third image sequence for other objects between the foreground object and the background object. In an embodiment, the purpose of totally reflecting the collimated light incident on the other part of the adjustment sub-units is that the collimated light will not be emitted from the other part of the adjustment sub-units and an image which may interfere with the images displayed at the first depth of field, the second depth of field and the third depth of field will not be formed. The display unit may be controlled to periodically perform the above steps of displaying the first frame of image, the second frame of image, and the third frame of image, so that the viewer can visually view an image sequence which comprises the foreground object at the first depth of field, the background object at the second depth of field, and other objects at the third depth of field.

It can be understood by those skilled in the art that the third period in which the third frame of image is displayed may be between the first period and the second period, or may also be after the second period. In addition, although only a case that there are three depths of field has been described in the above example, it is of course possible to achieve more depths of field by pixel borrowing in a case that a refresh rate of the display unit 210 is rapid enough, as long as the viewer can visually view an image sequence which comprises different respective objects at different depths of field.

According to the embodiment of the present disclosure, the light in the light exit direction of the display unit is collimated by the collimation unit and the collimated light is deflected by the adjustment unit, so that the light which is emitted by pixels at different positions in the display unit is imaged at different depths of field. In this way, virtual near-eye display is realized for a viewer and a depth of field of the resulting image may be adjusted to restore the real thing as much as possible without changing a physical structure of the existing display unit.

Although the present disclosure has been specifically shown and described with reference to exemplary embodiments thereof, it should be understood by those of ordinary skill in the art that various changes can be made to these embodiments in form and detail without departing from the spirit and scope of the present disclosure as defined by the appended claims.

I claim:

1. A display apparatus, comprising:
a display unit, having a plurality of pixels;
a collimation unit configured to collimate light in a light exit direction of the display unit to obtain collimated light; and
an adjustment unit configured to deflect the collimated light, so that light emitted by pixels at different positions in the display unit is imaged at different depths of field,
wherein the plurality of pixels in the display unit are arranged in an array, and light which is emitted by each of the plurality of pixels and is collimated by the collimation unit comprises at least a first part of light and a second part of light; and
wherein the adjustment unit comprises a plurality of adjustment sub-units, a first adjustment sub-unit and a second adjustment sub-unit are provided for the first part of light and the second part of light respectively, so that a first refraction angle for the first part of light is different from a second refraction angle for the second part of light, and
wherein at least one of an incident angle of the first part of light relative to the first adjustment sub-unit, an incident angle of the second part of light relative to the second adjustment sub-unit, a refractive index of the first adjustment sub-unit, and a refractive index of the second adjustment sub-unit is changed such that the first part of light and the second part of light converge at a predetermined depth of field.

2. The display apparatus according to claim 1, wherein for one row of pixels of two adjacent rows of pixels of the display unit, the first adjustment sub-unit and the second adjustment sub-unit are provided so that the first part of light and the second part of light converge at a first depth of field; and for the other row of pixels of the two adjacent rows of pixels of the display unit, the first adjustment sub-unit and the second adjustment sub-unit are provided so that the first part of light and the second part of light converge at a second depth of field different from the first depth of field.

3. The display apparatus according to claim 2, wherein the first adjustment sub-unit and the second adjustment sub-unit are provided so that the first part of light which is emitted by the one row of pixels and is collimated by the collimation unit and the second part of light which is emitted by the other row of pixels and is collimated by the collimation unit converge at a third depth of field which is between the first depth of field and the second depth of field.

4. The display apparatus according to claim 3, wherein the first adjustment sub-unit and the second adjustment sub-unit are provided so that the second part of light which is emitted by the one row of pixels and is collimated by the collimation unit and the first part of light which is emitted by the other row of pixels and is collimated by the collimation unit are totally reflected.

5. The display apparatus according to claim 2, wherein one of the first depth of field and the second depth of field is in a range of 0.20 meters to 0.30 meters in a direction opposite to the light exit direction of the display unit and the other of the first depth of field and the second depth of field is in a range of 3 meters to 5 meters in the direction opposite to the light exit direction of the display unit.

6. A display method for a display apparatus which comprises a display unit having a plurality of pixels; a collimation unit configured to collimate light in a light exit direction of the display unit to obtain collimated light; and an adjustment unit configured to deflect the collimated light so that light emitted by pixels at different positions in the display unit is imaged at different depths of field, the display method comprising:
in a first time period, displaying a first frame of image at one row of pixels of pixels of the display unit, the first frame of image being deflected by the adjustment unit so that the first frame of image is imaged at a first depth of field; and
in a second time period, displaying a second frame of image different from the first frame of image at another row of pixels of the display unit which is adjacent to the one row of pixels, the second frame of image being deflected by the adjustment unit so that the second frame of image is imaged at a second depth of field different from the first depth of field,
wherein the plurality of pixels in the display unit are arranged in an array, and light which is emitted by each of the plurality of pixels and is collimated by the collimation unit comprises at least a first part of light and a second part of light; and
wherein the adjustment unit comprises a plurality of adjustment sub-units, a first adjustment sub-unit and a second adjustment sub-unit are provided for the first part of light and the second part of light respectively, so that a first refraction angle for the first part of light is different from a second refraction angle for the second part of light, and
wherein at least one of an incident angle of the first part of light relative to the first adjustment sub-unit, an incident angle of the second part of light relative to the second adjustment sub-unit, a refractive index of the first adjustment sub-unit, and a refractive index of the second adjustment sub-unit is changed such that the first part of light and the second part of light converge at a predetermined depth of field.

7. The display method according to claim 6, wherein the first frame of image comprises a foreground image, and the second frame of image comprises a background image.

8. The display method according to claim 6, further comprising:
  in a third time period, displaying at least a third frame of image on the display unit, the third frame of image being deflected by the adjustment unit so that the third frame of image is imaged at a third depth of field which is between the first depth of field and the second depth of field.

* * * * *